US006081767A

United States Patent [19]

Witt et al.

[11] Patent Number: 6,081,767

[45] Date of Patent: Jun. 27, 2000

[54] METHOD AND DEVICE FOR DETERMINING THE AMOUNT OF UNDISSOLVED GAS IN A HYDRAULIC SYSTEM

[75] Inventors: Klaus Leonard Witt, Aachen, Germany; Roland Ludovicus Adrianus Vossen, Beverwijk, Netherlands

[73] Assignee: Sun Electric Systems B.V., Lg Weesp, Netherlands

[21] Appl. No.: 08/928,838

[22] Filed: Sep. 12, 1997

[30] Foreign Application Priority Data

Sep. 13, 1996 [NL] Netherlands ........................... 1004028

[51] Int. Cl.[7] ........................................................ G01M 3/02

[52] U.S. Cl. ................................ 702/55; 702/50; 702/51; 73/39; 73/19.01; 73/19.05

[58] Field of Search ................................. 702/55, 22–24, 702/31, 32, 45, 505, 100, 114, 138, 140, 156, 182–184, 193, FOR 121, FOR 115–FOR 119, FOR 128, FOR 127; 137/598, 614.04, 561 R, 551, 552, 557–559; 364/528.01, 528.16, 528.17, 528.36; 73/1.16, 1.73, 1.74, 1.57, 19.01, 19.02, 19.04, 19.05, 19.06, 19.1, 23.27, 23.36, 39, 40, 40.5 R, 152.22, 152.18, 152.55, 861, 861.02–861.04, 195–200, 861.49, 865.9, 121; 377/21; 700/281, 282, 285, 301; 395/500.28, 500.3

[56] References Cited

U.S. PATENT DOCUMENTS

| | | | |
|---|---|---|---|
| 5,357,800 | 10/1994 | Reuter et al. | 73/39 |
| 5,471,400 | 11/1995 | Smalley et al. | 702/51 |
| 5,635,631 | 6/1997 | Yesudas et al. | 73/19.05 |
| 5,767,389 | 6/1998 | LaFountain | 73/39 |
| 5,767,397 | 6/1998 | Eisele | 73/39 |
| 5,808,909 | 9/1998 | Rees | 73/39 |
| 5,908,983 | 6/1999 | Binder | 73/39 |

FOREIGN PATENT DOCUMENTS

| | | |
|---|---|---|
| 0552841 | 7/1993 | European Pat. Off. . |
| WO8808524 | 11/1988 | WIPO . |
| WO9705395 | 2/1997 | WIPO . |

*Primary Examiner*—Hal Wachsman
*Attorney, Agent, or Firm*—Brooks & Kusman P.C.

[57] ABSTRACT

The invention provides a method for determining the amount of undissolved gas present in a hydraulic system by supplying hydraulic medium thereto under overpressure, one of the parameters Pressure (P) and Volume (V) being set during this supply and the course of the variation of the other parameter (Volume (V) or Pressure (P)), which is dependent thereon and on the amount of undissolved gas, being recorded; the detection results are then compared with those which were calculated and/or are known for a reference system which corresponds to the system and is subjected to the same treatment when the hydraulic medium present therein contains no dissolved gas or a known amount of dissolved gas; from this comparison results an indication of the amount of undissolved gas, and also of its location, in the system.

2 Claims, 2 Drawing Sheets

METHOD AND DEVICE FOR DETERMINING THE AMOUNT OF UNDISSOLVED GAS IN A HYDRAULIC SYSTEM

BACKGROUND OF THE INVENTION

The invention relates to a method for determining the amount of undissolved gas present in a hydraulic system by supplying hydraulic medium to this system at excess pressure and detecting the changes in pressure or volume which occur in the process.

DESCRIPTION OF THE PRIOR ART

A method as described above is known from the European Patent Application EP-A-0,552,841 in the name of the applicant. According to this known method, which is based on the insight that the compressibility of the hydraulic medium is dependent on the amount of undissolved gas present therein, hydraulic medium is introduced into the system from the outside and thus the pressure in the system is changed from a first value to a second value while measuring the amount of hydraulic medium supplied.

This method yields good results when the entire system is pressurised, but cannot be used to establish where undissolved gas is situated. However when a hydraulic system contains a large number of narrow passages and components in which leakages of medium occur where the medium moves only slowly, this known method, which is in fact based on evaluating two determinations, namely a starting value and an end value, only provides an insight into the condition of the overall system.

The U.S. Pat. No. 5,471,400 describes a method for testing a hydraulic device, in this case a reciprocating compressor for detecting the occurrence of leaks, for instance between the piston rings and the cylinder walls. According to this method one analyses the variation of the pressure as a function of the cylinder volume and compares same with the nominal variation as it is when there are no leaks between the piston rings and the cylinder walls.

SUMMARY OF THE INVENTION

The invention is based on the insight that determination is possible by detecting and recording the curve of the relevant parameters plotted against time during the pressurisation and comparing the recording obtained with a recording which was carried out previously or was calculated for a comparable reference system with or without a known amount of undissolved gas. This results in a reliable insight into the location and amount of undissolved gas present in the system.

Thus my invention provides a method for determining the amount of undissolved gas present in a hydraulic system by supplying hydraulic medium to this system at overpressure and detecting the changes in pressure or volume which thereby occur in which, during supplying of the medium, one of the parameters: Pressure (P) and Volume (V) is set and then the course of the variation of the other parameter (Volume (V) or Pressure (P)), which is dependent thereon and on the amount of undissolved gas, is recorded, and the determination is based on a comparison of the results of the detection with those results which have been calculated and/or are known for a reference system which corresponds to the system and is subjected to the same treatment the hydraulic medium present therein containing a known amount of undissolved gas.

The rate at which hydraulic medium is compressed via a narrow passage to a spare depends on the compressibility of this medium and on the resistance of the passage. This compressibility is directly dependent on the amount of undissolved gas. It thus follows that detecting the course of the flow through this passage will provide an insight into the amount of undissolved gas in the next volume.

As, a hydraulic system contains as said, a great number of components, including pumps, actuators and valves, and is generally divided into a high-pressure section and a low-pressure section. Some parts of the system can only be compressed via narrow passages, so that the rate at which they are compressed is lower than in that section which can be reached directly. The course of this rate indicates, inter alia, the location of the undissolved gas. If one or more sections of the system are sealed off during the determination and undissolved gas is situated in these sealed-off sections, their presence cannot be detected. This drawback is eliminated by the method according to the invention when this method is carried out in such a manner that, for the reference system, the determination is carried out with a specific actuation sequence of the valves and actuators thereof and the measuring determination is carried out taking into account the actuation state of the valves and actuators.

Preferably the determination is carried out with the actuating elements in the rest position, the medium passing the leakage gas present therein.

In a preferred embodiment of my method the hydraulic medium is supplied in a predetermined sequence to the high-pressure side or the low-pressure side of the system to be tested.

My invention also provides an installation for carrying out my novel method comprising a supply source of hydraulic pressure medium (30, 32) and an outlet connection (42) to be connected to the installation to be tested, and having, between these components, in series and successively, a control unit (34) for setting the pressure or the volume flow of the hydraulic medium delivered and a measuring unit (40) for measuring the resultant delivery volume flow or the delivery pressure, said measuring unit being connected to a recording appliance (52) for recording the measurement results obtained during the test.

DESCRIPTION OF A PREFERRED EMBODIMENT

Figure 1:
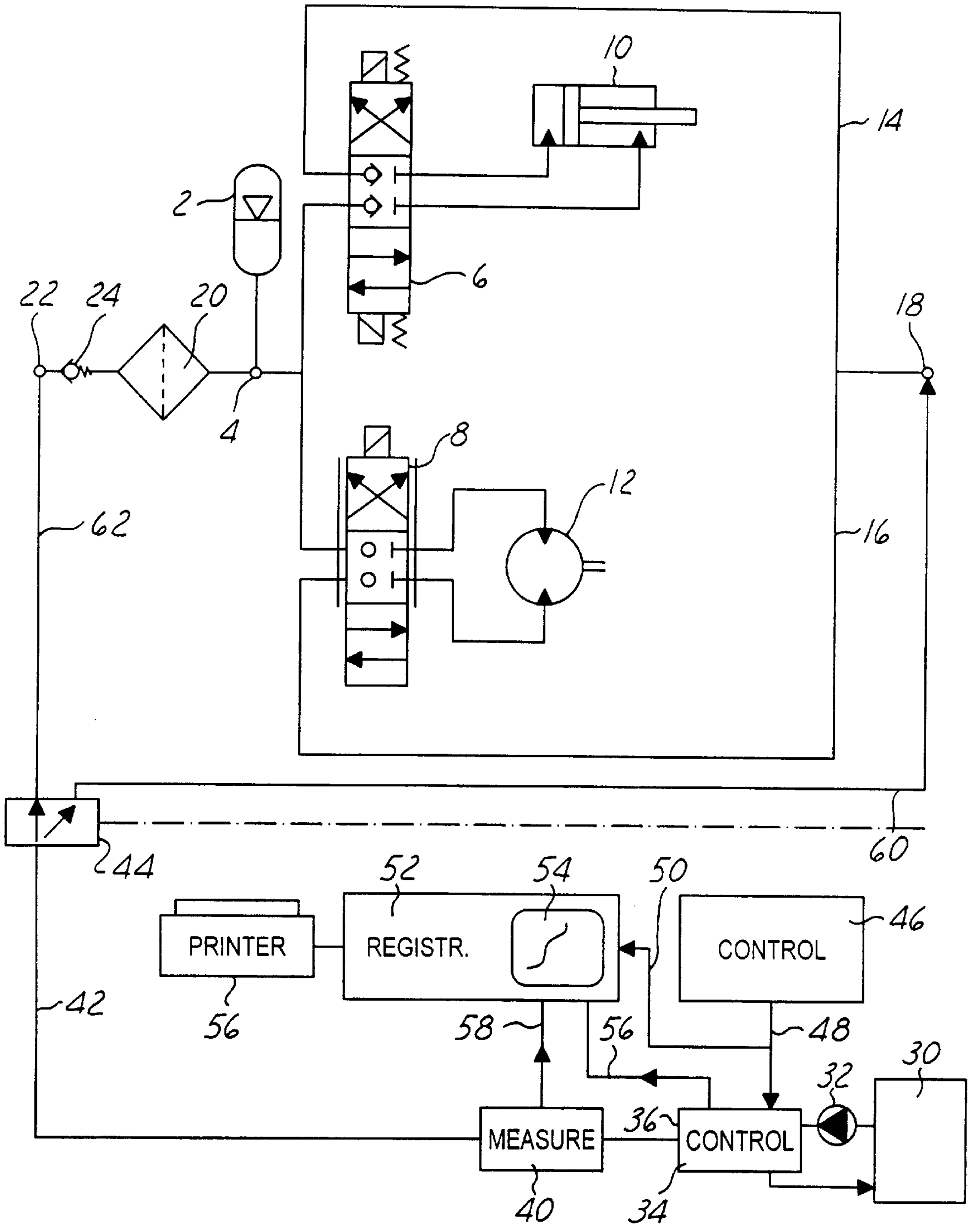
FIG. 1 shows a—simplified—diagram of a part of a hydraulic installation, with an installation for carrying out the method according to the invention connected thereto.

The part of a hydraulic installation illustrated in FIG. 1 comprises a hydraulic accumulator 2, the outlet 4 of which is connected, on the one hand, to the change-over valve 6 and, on the other hand, to the change-over valve 8; the outlets of the valve 6 are connected to the linear actuator 10 and those of the valve 8 to the hydraulic motor 12. The return lines 14, 16 are connected to a common return point 18.

The outlet of the accumulator 2 is connected via the filter 20 to the high-pressure filling point 22 via the non-return valve 24.

The installation according to the invention, by means of which this part of the hydraulic installation can be tested, is indicated in the diagram below the dot-dashed line, and comprises a storage reservoir 30, from which the hydraulic medium is supplied, via the feed pump 32, to a control unit 34, in which either the output pressure (P) is kept constant or the volume flow (V) flowing per time unit is kept constant. The outlet 36 from this control unit is connected to the measuring unit 40, from which the hydraulic medium (V) is supplied via the line 42 to the diverter valve 44 using outgoing lines 60 and 62. The measuring unit 40 measures either the amount of hydraulic medium flow (V) per time unit (in the case in which the pressure (P) is kept constant) or the pressure (P) occurring at its output 42 (in the case in which the volume flow per time unit (V), is kept constant).

A central control unit 46 is provided for controlling, via the line 48, the control unit 34, switching on and off the passage through the latter and setting the parameter P or V and, via the line 50, controlling a central recording unit 52 with display 54 and printer 56; the data is supplied to this unit via the line 56 (parameter set) and 58 (measured value).

Figure 2A:
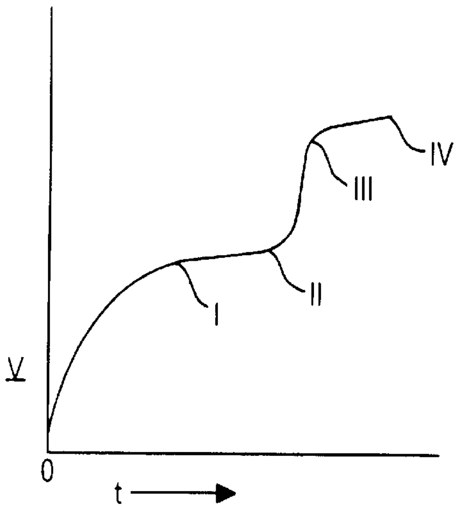
FIGS. 2*a* and 2*b* show graphs of the results obtained using this installation.
Figure 2B:
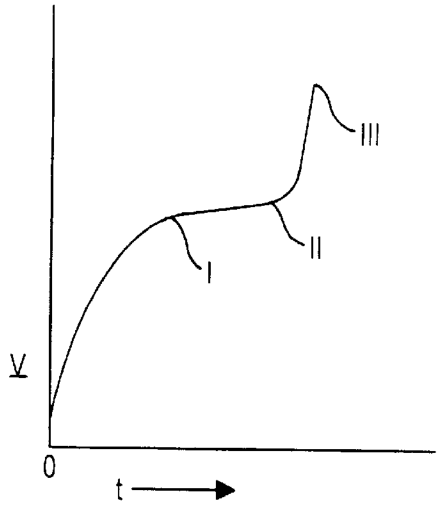
Figure 3:
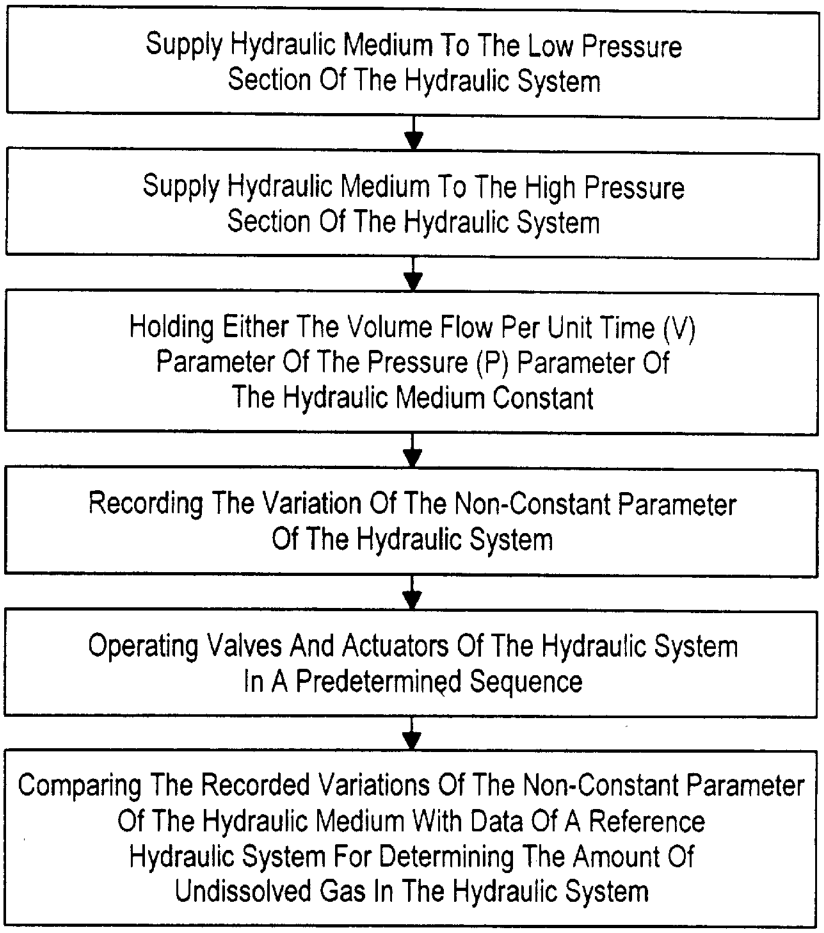
FIG. 3 illustrates a flow chart describing operation of the method according to the invention.

The determination will preferably be carried out using a fixed pressure, while measuring the volume flow through the measuring unit 40 per time unit. It is technically simpler to set a fixed output pressure than a fixed flow rate. In the following text, it is assumed that a constant filling pressure is used. The curve of the volume of hydraulic test medium supplied as a function of time is illustrated in FIG. 2*a* and FIG. 2*b*.

The operation is started by connecting the change-over valve to the line 60 leading to the low-pressure connection point 18. The hydraulic medium in this part of the system will be compressed relatively quickly, owing to the low resistance which prevails at this point and as far as the valves 6 and 8, as a result of which initially a relatively great flow takes place, corresponding to the curve between the point 0 and I in the graph in accordance with FIG. 2. During and after this period the leakage gaps in valve 8 will be filled, followed by the section between valve 8 and motor 12. The compression rate will be considerably lower here, owing to the greater resistance in the leakage gaps. This curve corresponds to the section I-II in the graph in accordance with FIG. 2.

If valve 6 is now opened, the section between this valve and the actuator 10 is compressed. The actuator 10 will first move to its end position (corresponding to the section II-III in the graph of FIG. 2) and then the hydraulic medium is compressed further, after which the final position IV is reached.

Pressure medium is now fed to the high-pressure point 22 via the change-over valve 44 and the test line 62. The pressure set will be higher than that at which the valve 24 opens and the part of the system between the valve 24 and the valves 6 and 8 will be compressed relatively quickly. This corresponds to the section 0-I in the graph in accordance with FIG. 2*b*.

Further filling of the motor 12 and the return line 16 at this high pressure via the leakage gaps of the valve 8 will take place more slowly, corresponding to the section I-II in the graph in accordance with FIG. 2*b*.

If valve 6 is then opened, the actuator 10 is actuated, with a relatively great amount of hydraulic medium flowing through, corresponding to the section II-III of the graph in accordance with FIG. 2*b,* and then the system is compressed; this corresponds to the section III-IV of the graph in accordance with FIG. 2*b*.

It is also possible to combine the measurements via the high-pressure side 22 and the low-pressure side 18. When filling via the low-pressure side 18, the return system fills up relatively quickly and the amount of undissolved gas therein is determined directly (see above).

If, immediately thereafter, filling is carried out via the high-pressure side 22, the high-pressure section will also be filled quickly and this section is measured separately. If the valve 8 is closed, the motor section is filled via the leakage gaps of this valve, while immediately thereafter the section between the valve 6 and the actuator is again filled quickly by opening this valve, meanwhile determining the flow rate.

The graphs shown in FIGS. 2*a* and 2*b* and the measured values obtained are compared with reference graphs (not shown) and reference values obtained or calculated for the case in which preferably no undissolved gas, or else a known amount of undissolved gas, is present in the system. The measured values obtained using the measuring device 40 are used to calculate the amount of undissolved gas in each section of the system—using of the known scientific laws and, if necessary, corrected for other measured or calculated influencing factors—and are supplied to the recording unit 52, in which they are stored; the resultant graphs can be shown on the display 54 and printed out using the printer 56. Since the reference determinations are also stored in the memory of the recording unit 52, they can be shown directly on the display 54 or printed out via the printer, so that direct comparison is possible.

What is claimed is:

1. A method for determining the amount of undissolved gas in a hydraulic medium of a hydraulic system, the hydraulic system having valves and actuators contained in a low pressure section and a high pressure section, the method comprising:

supplying the hydraulic medium to the low pressure section of the hydraulic system;

supplying hydraulic medium to the high pressure section of the hydraulic system, wherein the hydraulic medium supplied to the low and high pressure sections of the hydraulic system has a pressure greater than the pressure of the high pressure section of the hydraulic system, wherein the hydraulic medium has a volume flow per unit time (V) parameter and a pressure (P) parameter;

holding either the volume flow per unit time (V) parameter or the pressure (P) parameter of the hydraulic medium constant while supplying the hydraulic medium to the hydraulic system;

recording the variation of the non-constant parameter of the hydraulic medium while supplying the hydraulic medium to the low and high pressure sections of the hydraulic system;

operating the valves and actuators of the hydraulic system in a predetermined sequence while supplying the hydraulic medium to the low and high pressure sections of the hydraulic system; and comparing the recorded variation of the non-constant parameter of the hydraulic medium with data of a reference hydraulic system having a known amount of undissolved gas and subjected to the same predetermined operating sequence and operating conditions for determining the amount of undissolved gas in the hydraulic system.

2. Method according to claim 1, wherein the hydraulic medium is supplied in a predetermined sequence to the high-pressure side or the low-pressure side of the hydraulic system.

* * * * *